Feb. 21, 1956     H. E. GALLE     2,735,725
APPARATUS FOR DISCHARGING PULVERULENT MATERIAL
Filed Jan. 27, 1953

Inventor
Hans Emil Galle
By Pennie Edmonds Morton Barrows & Taylor
attys

United States Patent Office 2,735,725
Patented Feb. 21, 1956

2,735,725

APPARATUS FOR DISCHARGING PULVERULENT MATERIAL

Hans Emil Galle, Copenhagen, Denmark, assignor to F. L. Smidth & Co., New York, N. Y., a corporation of New Jersey Application January 27, 1953, Serial No. 333,533

Claims priority, application Great Britain January 30, 1952

2 Claims. (Cl. 302—52)

Containers of powdered material, such for example as cement, can be emptied by fluidising the material by gas so that it will flow under gravity to and through an outlet. Commonly the powder is fluidised by air admitted through one or more areas of porous material in the bottom of the container.

Often the area of the porous material is a long, narrow strip with the outlet at one end, and the powder flows downwards and along the strip. I have found that with this and other more complex arrangements there is a tendency for the powder to flow less freely at points remote from the outlet, even though the porous material is at a uniform inclination or flat and the volume of air flowing in unit time through each unit area of the porous material is the same over the whole of the material. The powder at these remote points can be dislodged by a large flow of air, but it is extravagant, and often impracticable, to provide such a flow of air throughout the porous material.

According to the present invention, in the discharge of material from a container having a horizontal or inclined porous bottom part, the gas flow is made greater at points remote from the outlet than at points nearer the outlet. By "gas flow" I mean throughout this specification the volume of gas flowing in unit time through unit area of porous bottom.

If the bottom is a longitudinally inclined strip, the gas flow decreases stepwise or continuously from the upper to the lower end of the strip.

Preferably the container includes an internal trough comprising a uniformly longitudinally inclined porous bottom wall made up of a central section and lateral sections diverging upwardly from the side edges of the bottom section and the gas flow decreases along the bottom wall from the upper to the lower end of the trough. Preferably, the gas flow through the lateral section is less than through the central section.

The differences in gas flow may be brought about by admitting gas at different pressures to different compartments beneath the porous bottom or the trough. Alternatively or in addition the porous bottom or trough may be made so that different areas present different resistances to penetration by the gas. For example the porous bottom or the trough may be of felt sandwiched between layers of canvas, and the number of layers of canvas be different in different areas.

The accompanying drawings show two examples of containers according to the present invention. In these drawings.

Figure 1:
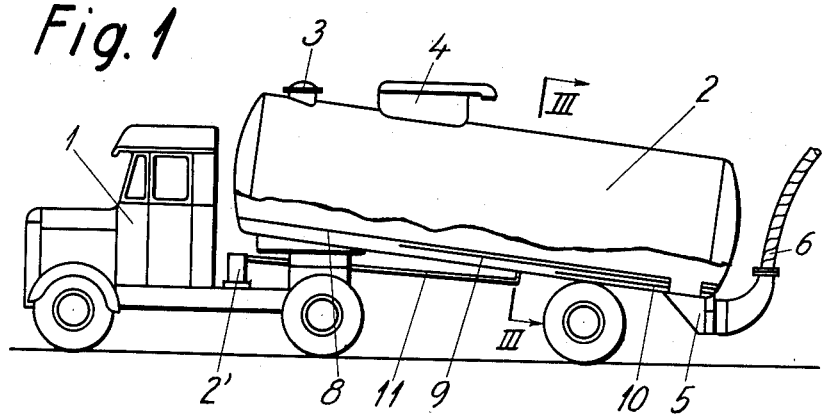
Figure 1 is a diagrammatic side elevation, partly in section, of one container mounted on a truck.
Figure 2:
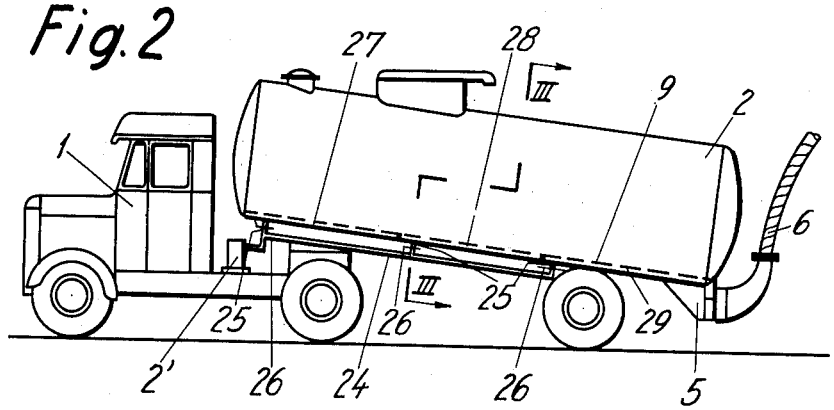
Figure 2 is a view similar to Figure 1 of a second container.

In both Figures 1 and 2 the container 2 is cylindrical and is mounted on the truck 1 with its axis inclined to the horizontal. Each container has an inlet 3 for powdered material such as cement and an outlet 5 at the lowest point of the container leading to a hose 6. Moreover, at the top of the container there is an air outlet 4 containing a filter. At the bottom of each container there is a porous bottom wall 9 of trough form comprising a central section and at least a pair of lateral sections diverging upwardly from the opposite side edges of the central section, the sections extending substantially the length of the bottom wall. Beneath the bottom wall is a space to which air can be supplied by a blower 2' driven by the engine of the truck. The air passes through the bottom wall and fluidises the material, so assisting or causing it to flow to the outlet 5. The air can either be permitted to escape through the outlet 4 or alternatively confined so as to expel the material forcibly along the hose 6.

Figure 3:
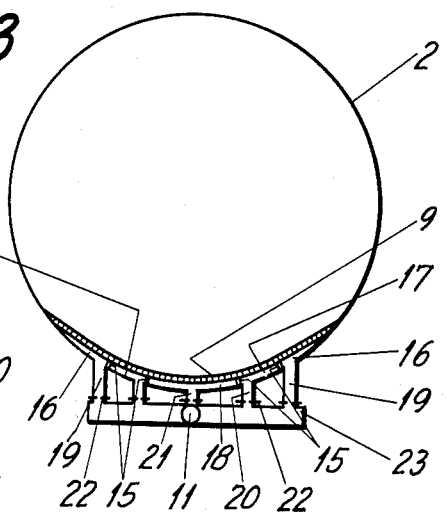
Figure 3 is an enlarged section of the line III—III in each of Figures 1 and 2.

In the construction shown in Fig. 3, the bottom wall includes a central section and two lateral sections on each side thereof and the space beneath the bottom wall is divided by longitudinal partitions 15 into compartments closed at the top by the respective sections of the wall. The compartment 18 lies beneath the central section and compartments 17 lie beneath the lateral sections adjoining the central section, while compartments 16 lie beneath the outer lateral sections of the bottom wall.

Figure 4:
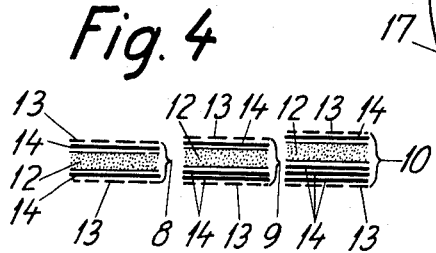
Figure 4 is a series of enlarged diagrammatic vertical sections through the porous bottom of the container shown in Figure 1.

In the container shown in Figure 1 the compartments run under the whole length of the bottom wall of the trough, and the porous bottom wall is divided into three zones 8, 9 and 10. As shown in Figure 4, the material forming the porous bottom wall consists of a layer of felt 12, layers of canvas 14 and protective layers of wire netting 13. The number of layers of canvas increases from zone to zone, as indicated diagrammatically in Figure 1 and in detail in Figure 4, so that the flow is greatest through the zone 8, less through the zone 9 and least through the zone 10.

The compartments are supplied with air from the blower 2' through a pipe 11 and thence through a manifold 23 and branch pipes 19, 20 and 21. Orifice plates 22 in the branch pipes restrict the flow of air so that the pressure in the compartment 17 is less than in the compartment 18 and the pressure in the compartment 16 is still less. Thus at any given distance from the front of the container the gas flow through the lateral sections of the bottom wall adjoining the central section is less than through the central section but greater than the flow through the outer lateral sections of the bottom wall.

By this arrangement the gas flow at all points is substantially no more than is necessary to permit the material to flow. When the container is emptied the material first flows away from the part nearest the outlet 5 and then material is dislodged from towards the upper end of the container without air being wasted at the lower end. Thus the container can be completely emptied in an efficient manner.

In the container shown in Figure 2 there is no variation in the nature of the porous bottom wall along the length of the container, but its permeability is the same throughout its length as in the central zone 9 in Figures 1 and 4. In order to obtain the graduation of gas flow, the compartments beneath the bottom wall are longitudinally sub-divided. Thus, as shown in Figure 2, there are three such compartments 27, 28 and 29 beneath the bottom wall, and each compartment is supplied from a pipe 24 through a branch 25 in which there is an orifice plate 26. These orifice plates are so proportioned that the pressure in the compartment 27 is higher than that in the compartment 28 and higher still than that in the compartment 29.

Instead of the stepwise graduation of gas flow illustrated, the graduation of gas flow may be made smoothly progressive. For example, the porous bottom may include a layer of felt which tapers in thickness. Alternatively a porous bottom composed of felt and canvas may be protected by perforated metal sheets and the gas flow may be determined by the spacing and sizes of the perforations.

If a container is provided with an outlet in the form of a duct with a porous bottom so that the material continues to be aerated in the duct then the arrangement may be such that the gas flow through the bottom of the duct is still less than the gas flow just inside the container.

I claim:

1. A container for pulverulent material, which comprises an enclosure having a bottom wall sloping lengthwise and provided with a discharge outlet at its low end, the wall being permeable by air and formed of a central section and at least a pair of lateral sections diverging upwardly from the opposite side edges of the central section, the sections extending substantially the length of the wall, means forming air chambers having the respective sections at their tops, and means for supplying air under a selected pressure to the chamber beneath the central section and at lower pressures to the chambers beneath the lateral sections.

2. A container as defined in claim 1, in which there are two lateral sections on each side of the central section, and the outer lateral sections are of steeper inclination transversely of the container than the lateral sections adjoining the central section, there is an air chamber beneath each section, and the pressure of the air supplied to the lateral sections adjoining the central section is less than that of the air supplied to the central section and greater than that of the air supplied to the outer lateral sections.

References Cited in the file of this patent

UNITED STATES PATENTS

| | | |
|---|---|---|
| 1,971,853 | Ihlefeldt | Aug. 28, 1934 |
| 2,219,283 | Horn | Oct. 29, 1940 |
| 2,589,968 | Schemm | Mar. 18, 1952 |
| 2,708,602 | Galle | May 17, 1955 |